United States Patent
Vick et al.

(10) Patent No.: US 7,516,361 B2
(45) Date of Patent: *Apr. 7, 2009

(54) METHOD FOR AUTOMATIC CHECKPOINT OF SYSTEM AND APPLICATION SOFTWARE

(75) Inventors: Christopher A. Vick, San Jose, CA (US); Michael H. Paleczny, San Jose, CA (US); Jay R. Freeman, Palo Alto, CA (US); Lawrence G. Votta, Jr., Sammamish, WA (US)

(73) Assignee: Sun Microsystems, Inc., Santa Clara, CA (US)

( * ) Notice: Subject to any disclaimer, the term of this patent is extended or adjusted under 35 U.S.C. 154(b) by 512 days.

This patent is subject to a terminal disclaimer.

(21) Appl. No.: 11/332,252

(22) Filed: Jan. 13, 2006

(65) Prior Publication Data

US 2006/0294435 A1 Dec. 28, 2006

Related U.S. Application Data (60) Provisional application No. 60/694,171, filed on Jun. 27, 2005.

(51) Int. Cl.
*G06F 11/00* (2006.01)
(52) U.S. Cl. ............... 714/15; 714/4; 714/38
(58) Field of Classification Search ............ None
See application file for complete search history.

(56) References Cited

U.S. PATENT DOCUMENTS

| | | | |
|---|---|---|---|
| 5,802,267 A * | 9/1998 | Shirakihara et al. | 714/15 |
| 5,911,040 A * | 6/1999 | Hirayama et al. | 714/38 |
| 5,923,832 A * | 7/1999 | Shirakihara et al. | 714/37 |
| 6,523,059 B1 | 2/2003 | Schmidt | |
| 6,842,853 B1 | 1/2005 | Bush et al. | |
| 6,941,489 B2 * | 9/2005 | DeLano | 714/10 |
| 7,013,454 B2 | 3/2006 | Bush et al. | |
| 7,080,374 B2 | 7/2006 | Dahlstedt et al. | |
| 7,086,053 B2 | 8/2006 | Long et al. | |
| 7,114,097 B2 | 9/2006 | McLamb et al. | |
| 2001/0054057 A1 * | 12/2001 | Long et al. | 709/108 |
| 2004/0148603 A1 | 7/2004 | Baylis | |
| 2005/0289414 A1 | 12/2005 | Adya et al. | |
| 2006/0236152 A1 * | 10/2006 | Archer et al. | 714/16 |
| 2006/0294435 A1 | 12/2006 | Vick et al. | |
| 2007/0136402 A1 | 6/2007 | Grose et al. | |

OTHER PUBLICATIONS

Agarwal, Saurabh, Garg, Rahul, Gupta, Meeta S., and Moreira, Jose E., "Adaptive Incrementcal Checkpointing for Massively Parallel Systems", ICS 2004, 10 pages.

(Continued)

*Primary Examiner*—Christopher S McCarthy
(74) *Attorney, Agent, or Firm*—Osha • Liang LLP (57) ABSTRACT

A method for checkpointing a system that includes receiving a stop command by an executing thread from a master, wherein the executing thread executes an operating system, continuing execution of the executing thread until a checkpoint is reached after receiving the stop command, halting execution of the executing thread at the checkpoint, and checkpointing the system by storing a state and a snapshot of memory.

21 Claims, 9 Drawing Sheets

OTHER PUBLICATIONS

Petrini, Fabrizio, Davis, Kei and Sancho, Jose Carlos, "System-Level Fault-Tolerance in Large-Scale Parallel Machines with Buffered Coscheduling", 18th International Parallel and Distributed Processing Symposium (IPDPS'04), Apr. 26-30, 2004, 8 pages.

Elnozahy, E. N., Plank, J. S. and Fuchs, W.K., "Checkpointing for Peta-Scale Systems: A Look into the Future of Practical Rollback-Recovery", IEEE Transactions on Dependable and Secure Computing, vol. 1, No. 2, Apr.-Jun. 2004, 12 pages.

Bronevetsky, Greg, Marques, Daniel, Pingalli, Keshav and Stodghill, Paul, "Automated Application-level Checkpointing of MPI Programs", Proceedings of the ninth ACM SIGPLAN symposium on Principles and practice of parallel programminng, 2003, 11 pages.

Tuthill, B., Johnson, K., Wilkening, S. and Roe, D. "IRIX Checkpoint and Restart Operation Guide", Silicon Graphics, Inc. Mountain View, Ca, 1999, 63 pages.

Kavanaugh, Gerard P. and Sanders, William H., "Performance Analysis of Two Time-Based Coordinated Checkpointing Protocols", In 1997 Pac.Rim Int.Sympo. on Fault-Tol. Systmes, Dec. 1997, 8 pages.

Plank, James S., "An Overview of Checkpointing in Uniprocessor and Distributed Systems, Focusing on Implementation and Performance", Technical Report of University of Tennessee, Jul. 1997, 20 pages.

Elnozahy, E.N., Alvisi, Lorenzo, Wang, Yi-Min and Johnson, David B., "A Survey of Rollback-Recovery Protocols in Message-Passing Systems", Technical Report, Carnegie Mellon Univ., Oct. 1996, 42 pages.

Koo, Richard and Toueg, Sam, "Checkpointing and Rollback-Recovery for Distributed Systems", IEEE Transactions on Software Engineering, vol. SE-13. No. 1, 1987, 9 pages.

Chandy, K. Mani and Lamport, Leslie, "Distributed Snapshots: Determining Global States of Distributed Systems", In ACM Transactions on Computer Systems, 3(1), Aug. 1985, 13 pages.

* cited by examiner

METHOD FOR AUTOMATIC CHECKPOINT OF SYSTEM AND APPLICATION SOFTWARE

CROSS-REFERENCE TO RELATED APPLICATIONS

This application claims benefit under 35 U.S.C. § 119(e) of U.S. Provisional Application Ser. No. 60/694,171 filed on Jun. 27, 2005.

STATEMENT REGARDING FEDERALLY SPONSORED RESEARCH OR DEVELOPMENT

The present invention was made with the support of the government of the United States under contract NBCH3039002 awarded by the Defense Advanced Research Projects Administration. The United States government may have certain rights in the present invention.

BACKGROUND

A typical distributed system includes several interconnected nodes. The nodes may communicate by the use of messages, shared memory, etc. Through communication, nodes in a distributed system are able to provide greater functionality. For example, the distributed system may be used for communication between users, solving computationally hard problems, dividing tasks between nodes to provide greater throughput (e.g., a web server accessing a database server), etc.

Occasionally, one or more nodes in the distributed system may fail. The failure of a node may be attributed to the hardware failing or the software failing. For example, hardware failure may occur when the processor crashes, upon failure to transmit data (e.g., transmit messages, data to and from storage, etc.), etc. Likewise, software failure may occur when the module of an application or the operating system fails to execute properly (or as expected). For example, an application or operating system thread may execute an infinite loop, several threads waiting for resources may cause deadlock, a thread may crash, etc.

Managing a distributed system when failure occurs involves detecting when a failure has occurred and recovering from the failure before the entire distributed system crashes. Often, rather than restarting the distributed system from the beginning in order to recover, the distributed system restarts execution from a checkpoint. A checkpoint is a point in the execution of a distributed system in which the memory information is stored in order to allow recovery. With communication and the resulting possible dependencies, one part of the distributed system cannot be restarted from the checkpoint if the part is dependent on another part of the distributed system. Accordingly, when an error is detected, the entire distributed system is restarted from the checkpoint. Thus, in order to perform a checkpoint, the entire distributed system must perform the checkpoint at the same point in execution.

One method for performing a checkpoint is for a master node to send a stop thread call with a command to respond to a child node. When the child node receives the stop thread call, the child node immediately stops whatever thread is executing, regardless of whether the thread is in a critical section, and performs a checkpoint. The child may then respond to the master that a checkpoint has been performed.

SUMMARY

In general, in one aspect, the invention relates to a method for checkpointing a system that includes receiving a stop command by an executing thread from a master, wherein the executing thread executes an operating system, continuing execution of the executing thread until a checkpoint is reached after receiving the stop command, halting execution of the executing thread at the checkpoint, and checkpointing the system by storing a state and a snapshot of memory.

In general, in one aspect, the invention relates to a system for checkpointing that includes a plurality of subordinates configured to receive a stop command, continue execution until reach a checkpoint after receiving the stop command, halt execution at the checkpoint, forward a response if the stop command is processed, receive a checkpoint command, and checkpoint the system by storing a state and a snapshot of memory at the checkpoint, and a master configured to send the stop command to a subordinate in the plurality of subordinates, wherein the subordinate is an operating system thread, and send a checkpoint command to the subordinate.

In general, in one aspect, the invention relates to a distributed system having a plurality of nodes that includes a plurality of subordinates executing on the plurality of nodes configured to receive a stop command, continue execution until reach a checkpoint after receiving the stop command, halt execution at the checkpoint, forward a response if the stop command is processed, receive a checkpoint command, and checkpoint the system by storing a state and a snapshot of memory at the checkpoint, and a master comprising at least one node configured to send the stop command to a subordinate in the plurality of subordinates, wherein the subordinate is an operating system thread, and send a checkpoint command to the subordinate.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for automatic checkpointing and recovery of a distributed system. Specifically, embodiments of the invention use a cooperative process to perform an automatic checkpoint of the distributed system and recover the distributed system if an error is detected. More specifically, embodiments of the invention create a checkpoint on each thread of each node that may be used to recover the distributed system or affected portions (i.e., nodes, applications, or processes) of the distributed system.

In one embodiment of the invention, a checkpoint corresponds to a point in the execution of a node or thread in which the node or thread may stop and store state information and a snapshot of memory. When an application or the entire distributed system fails, the snapshot of the memory and state information may be reloaded from the checkpoint.

Figure 1:
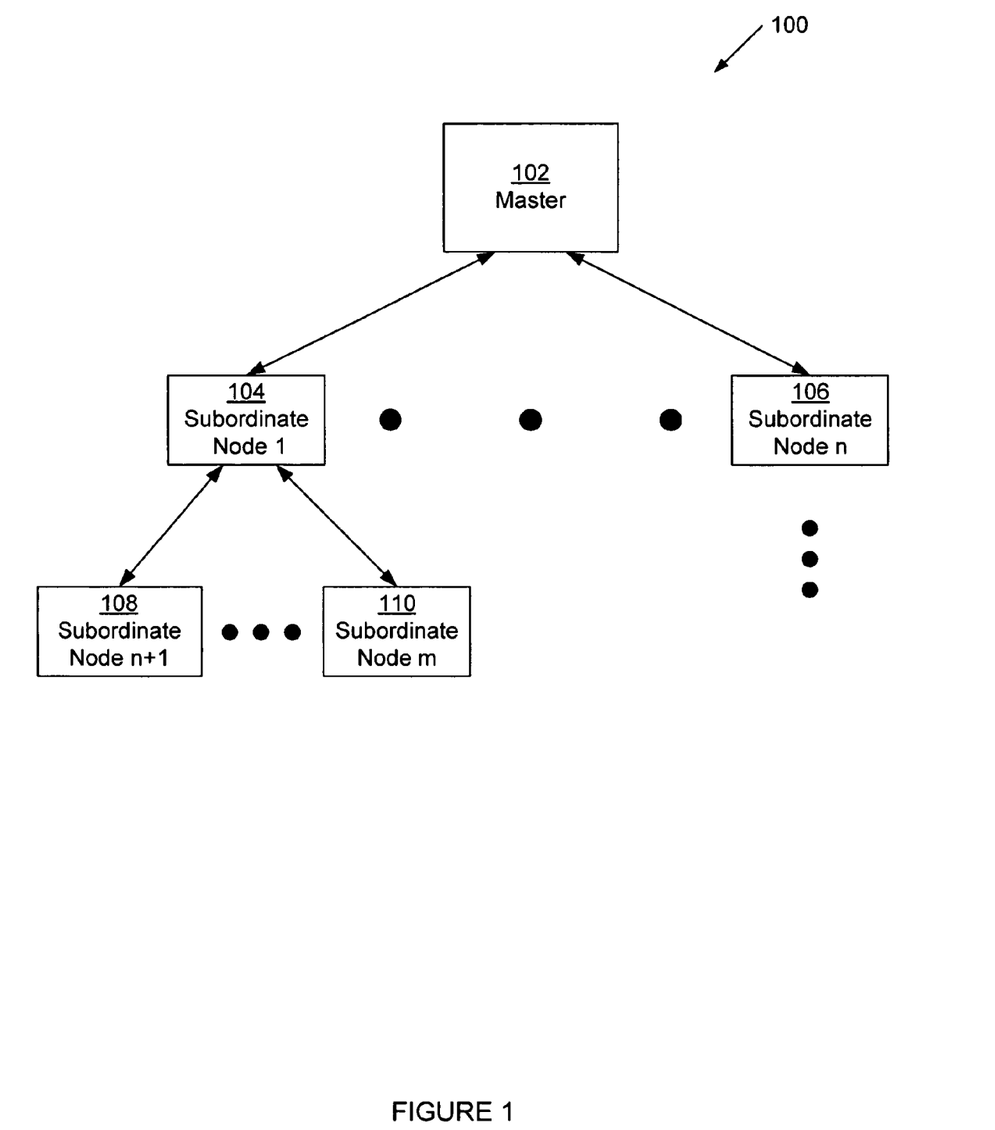
FIG. 1 shows a distributed system for checkpointing in accordance with one embodiment of the invention.

FIG. 1 shows a distributed system for checkpointing in accordance with one embodiment of the invention. The distributed system (100) corresponds to virtually any type of interconnection of nodes (e.g., 102, 104, 106, 108, 110) in virtually any topology. For example, the nodes (e.g., 102, 104, 106, 108, 110) may be arranged in a star, a ring, a tree, etc. Additionally, the distributed system (100) may correspond to a multiple processors with shared memory system, several interconnected servers, or a group of computers connected over the Internet. Further, the distributed system (100) may include one or more subsystems (not shown) in which the subsystem is of a different type and topology than the parent system (i.e., the distributed system may itself be composed of an aggregation of one or more distributed systems).

Those skilled in the art will appreciate that while FIG. 1 shows a hierarchical structure (i.e., a tree), the hierarchical structure illustrates the relationships between the nodes in accordance with one embodiment of the invention. Accordingly, the hierarchical structure may not be indicative of the actual topology of the distributed system.

As shown in FIG. 1, the distributed system (100) includes a master (102) and multiple subordinate nodes (e.g., 104, 106, 108, 110). Each of these aforementioned components is described in more detail below.

In one embodiment of the invention, a master (102) may include the necessary hardware and/or software to start the checkpoint process, detect hardware or software failure in any of the nodes (e.g., 102, 104, 106, 108, 110) and start the recovery process. The master (102) may correspond to a particular thread, a particular node, or to multiple master nodes. In the scenario of multiple master nodes, each master node may include the functionality to communicate with other master nodes to allow for synchronizing the checkpointing and recovery (if required).

In one embodiment of the invention, the master (102) is operatively connected, directly or indirectly, to one or more subordinate nodes (e.g., 104, 106, 108, 110). The subordinate nodes (e.g., 104, 106, 108, 110) include functionality to receive communication from the master (102) and respond to the master (102). Further, in one embodiment of the invention, each subordinate node (e.g., 104, 106, 108, 110) may also have one or more child nodes (e.g., 108, 110) and a parent node (e.g., 104, 102). For example, node 1 (104) is the parent of node n+1 (108) and node m (110). Accordingly, node n+1 (108) and node m (110) are child nodes of node 1 (104).

Those skilled in the art will appreciate that each node (e.g., 102, 104, 106, 108, 110) in the distributed system (102) may correspond to virtually any type of device, such as a server (i.e., web server, database server, etc.), personal computer, laptop computer, cell phone, personal digital assistant, embedded computer, etc.

Figure 2:
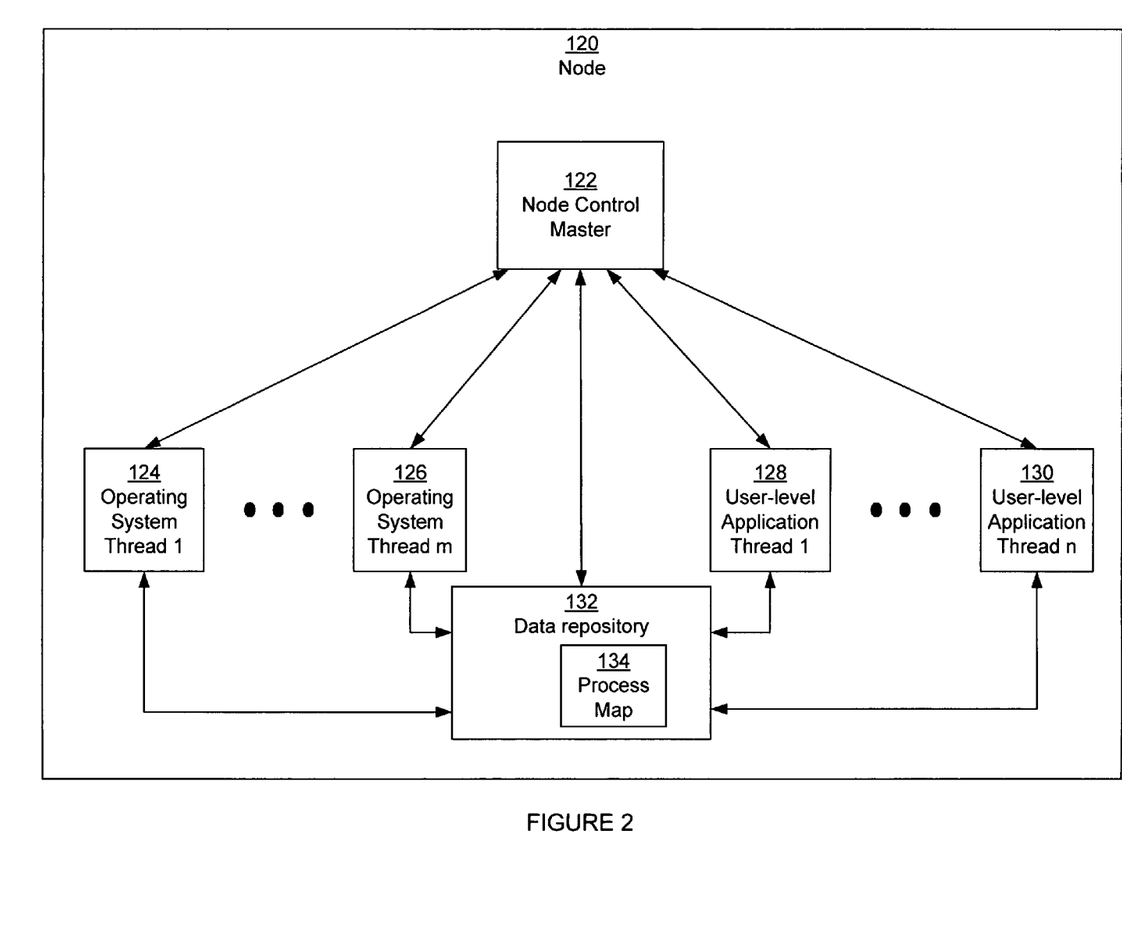
FIG. 2 shows a node in the distributed system in accordance with one embodiment of the invention.

FIG. 2 shows a node (120), such as nodes (102, 104, 106, 108, 110) shown in FIG. 1, in a distributed system in accordance with one embodiment of the invention. Node (120) includes a node control master (122), one or more operating system threads (e.g., 124, 126), one or more application threads (e.g., 128, 130), and a data repository (132). Each of these aforementioned components is described in more detail below.

In one embodiment of the invention, the node control master (122) corresponds to a parent thread, which is responsible for checkpointing the node (120). The node control master (122) may correspond to one or more threads of the operating system or of a user level application executing on the node (120). Specifically, in one embodiment of the invention, the node control master (122) includes functionality to receive a checkpoint command, a restart command, and a rollback command from a parent node and forward the command to child nodes (if any) and child threads (e.g., 124, 126, 128, 130). Further, the node control master (122) may include functionality to receive messages from the child nodes (if any) and child threads (e.g., 124, 126, 128, 130) and forward the messages to the parent of the node (120).

The child threads of the node control master (122) are the application threads. Specifically, an application thread may correspond to an operating system thread (e.g., 124, 126) or to a user-level application thread (e.g., 128, 130). An operating system thread (e.g., 124, 126) corresponds to any threads required for executing the instructions of the operating system. A user-level application thread (e.g., 128, 130) corresponds to any threads that execute the instructions of any user-level application(s) on the node.

Specifically, a group of application threads (e.g., 128, 130) may correspond to a process executing an application in the distributed system. In one embodiment of the invention, embedded in the instructions for the application is checkpoint code. The checkpoint code includes the instructions required for the thread to create a checkpoint (as described below).

In one embodiment of the invention, associated with the application threads (e.g., 124, 126, 128, 130) and the node control master (122) is a data repository (132). The data repository (132) corresponds to any type of storage unit for data. The data repository (132) includes functionality to store the states of the threads (e.g., 122, 124, 126, 128, 130) and a snapshot of memory at the checkpoint. Specifically, in one embodiment of the invention, all state and memory information related to executing the threads may be stored in the data repository (132). For example, the state information and snapshot of memory may include program counters, execution stack, local and global variables, indication of related resources (e.g., open files), identifiers, memory location ownership information, etc.

Additionally, in one embodiment of the invention, the data repository (132) may keep track of the relationship between the state and memory and the associated threads. By keeping track of the relationship between portions of memory and the threads, certain threads of the node may be restored rather than having to restore an entire node.

Further, in one embodiment of the invention, the data repository (132) may store multiple historical checkpoints. Storing such historical checkpoints allow for recovery to occur from different points in the execution of the node or threads on the node.

Typically, in one embodiment of the invention, the data repository (132) may also store a process map (134). Specifically, in one embodiment of the invention, every application that is executed by the application threads (e.g., 122, 124, 126, 128, 130), in the distributed system has associated with it a full listing in the process map (132) of every process which is associated with the application and operating system. A process may correspond to one or more related threads (e.g., 122, 124, 126, 128, 130) in the distributed system (as discussed above). For example, when a thread of a process (e.g., 122, 124, 126, 128, 130) calls another process (e.g., using a method call, using a remote method invocation, etc.), the process map (134) keeps track of the application of the caller thread with the process being called in accordance with one embodiment of the invention. More specifically, a key (such as a 64-bit value) is kept for each application. The key may be used, for example, to tag a process. The process map (134) may store both the process identifier and the key of the associated application.

Further, the process map (134) may be saved with a checkpoint in accordance with one embodiment of the invention. Accordingly, in one embodiment of the invention, for each historical checkpoint (as described above), a process map (134) may be stored for the historical checkpoint.

Figure 3:
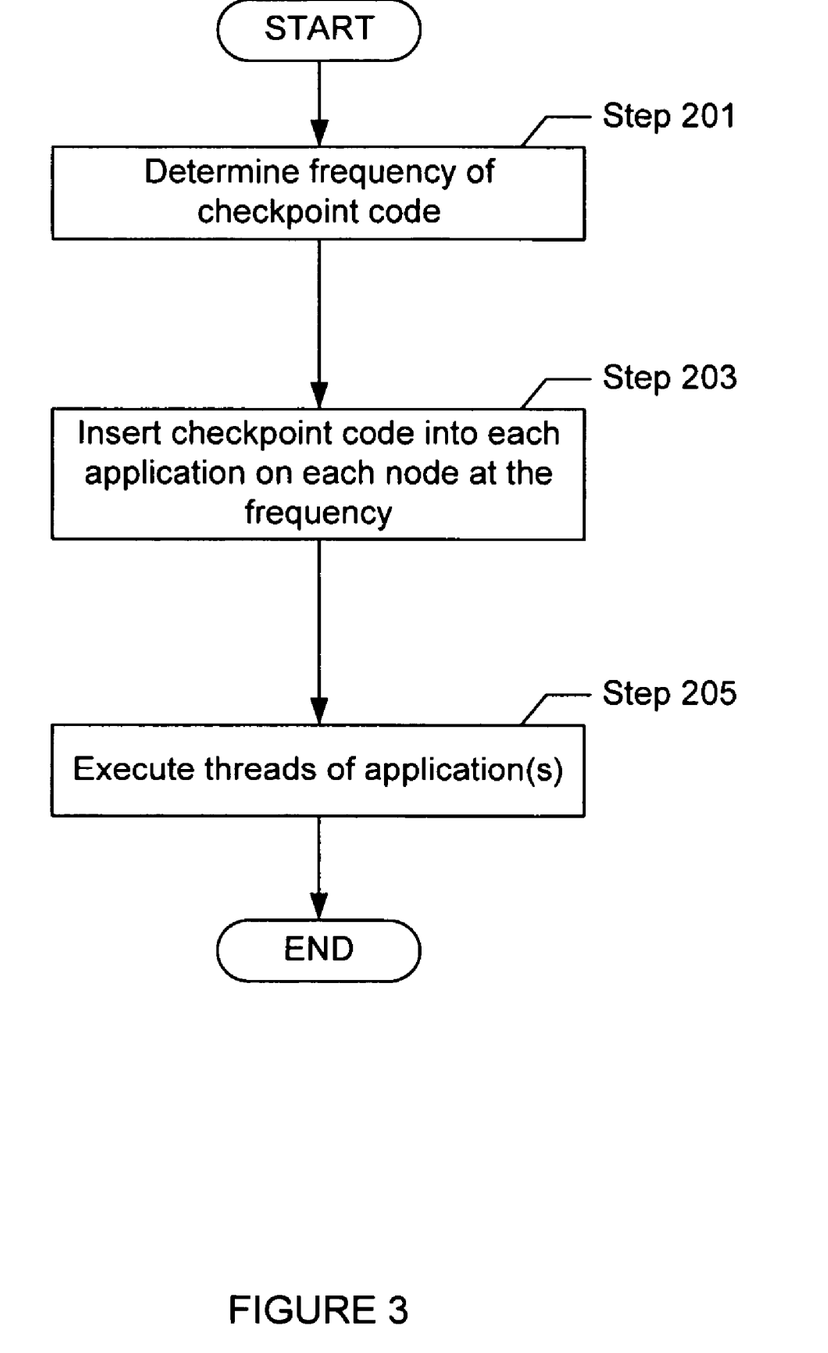
FIG. 3 shows a method for initializing a distributed system for checkpointing in accordance with one embodiment of the invention.

FIG. 3 shows a method for initializing a distributed system for checkpointing in accordance with one embodiment of the invention. Initially, in one embodiment of the invention, the frequency of checkpoint code is determined (Step 201). The frequency of the checkpoint code may be determined according to the use of the distributed system. For example, banking system may require higher fault tolerance than in a distributed system used for science. Likewise, the distributed system used for science may require more throughput and may not be as concerned with constantly ensuring the distributed system is functioning properly. Thus, for example, the banking system may have a frequency of checkpoint code for every 100 instructions, whereas the distributed system used for science may have a frequency of checkpoint code for every billion instructions. Accordingly, the frequency of the checkpoint may be configurable in order to be appropriate for the use of the distributed system.

Next, in one embodiment of the invention, checkpoint code is inserted into the instructions of each application (i.e., operating system or user-level application) on each node using the frequency (Step 203). The checkpoint code may be inserted by the programmer designing the application, a compiler using dynamic code generation at runtime, an interpreter using dynamic code generation at runtime, etc. Further, in one embodiment of the invention, the checkpoint code is inserted in a safe portion of the code and in a manner ensuring that no arbitrary large number of instructions can execute between any two checkpoints, such as in loops with a large number of iterations. For example, the checkpoint may be inserted so that critical sections, such as critical kernel loops, and time sensitive sections, such as within a trap handler, are not interrupted. Accordingly, the thread may be interrupted for the checkpoint at a time in which the thread will not fail because of the interruption.

Further, typically, in one embodiment of the invention, the checkpoints are inserted in locations which guaranty the consistency and completeness of the state of the application at that point in the execution of the application. For example, the checkpoint may not be inserted in a file write operation since the interruption could result in some state not being present in either the file being written or the checkpoint due to timing issues. Another example includes not inserting the checkpoint while writing to a network. Specifically, the checkpoint must be inserted when the complete state of the machine may be identified. In order to ensure consistency and completeness, the checkpoint code is inserted using data flow analysis and an optimizing compiler. The data flow analysis may specify where in the execution of the program, there is a complete and consistent view of the application's state. Accordingly, portions of the application may be tagged to prevent a checkpoint when there is not a complete and consistent view of the application's state.

Continuing with FIG. 3, after the checkpoint code is inserted into each application on each node, the processes which execute the instructions of the applications may be executed by executing one or more of the threads of the processes (Step 205). As processes begin executing by executing the associated threads, in one embodiment of the invention, the start of the process may be recorded in the process map. At this stage, the distributed system is ready for checkpointing and recovery in accordance with one embodiment of the invention.

Figure 4:
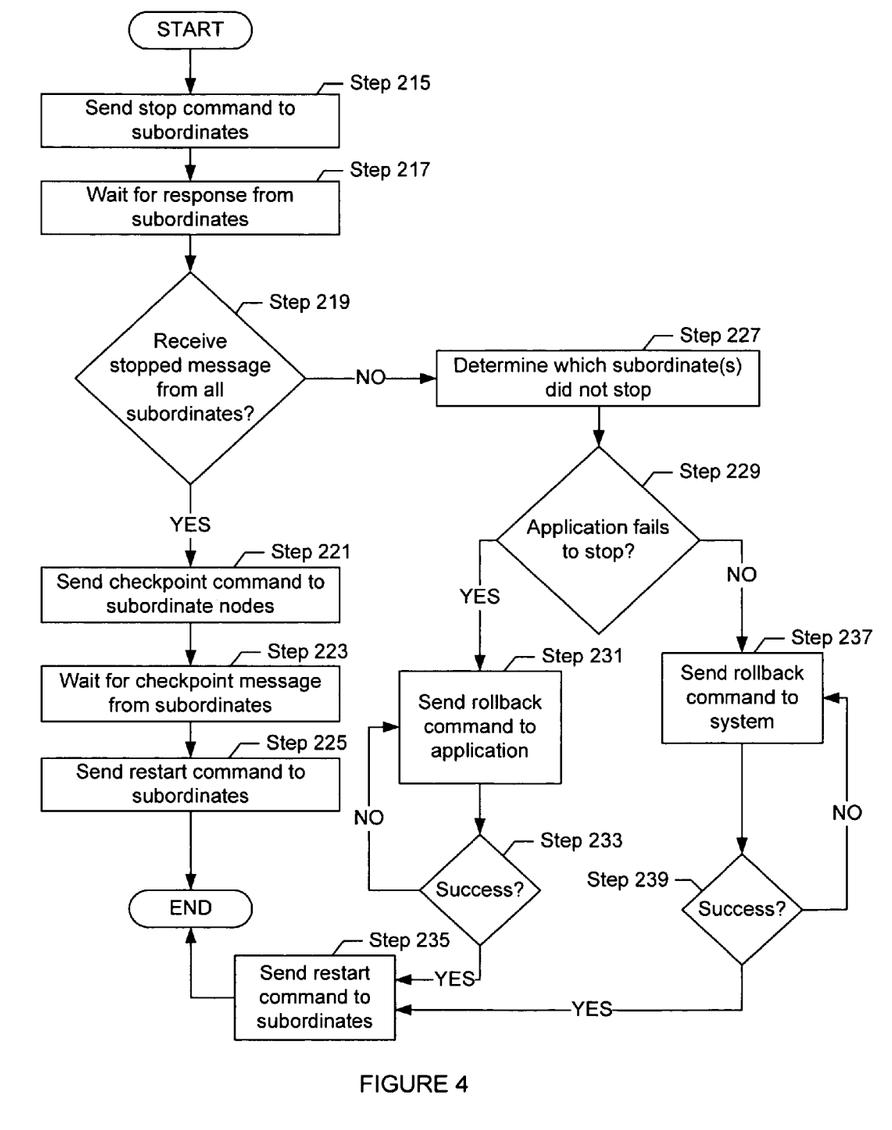
FIG. 4 shows a method for checkpointing and recovery in a distributed system by a master in accordance with one embodiment of the invention.
Figure 5A:
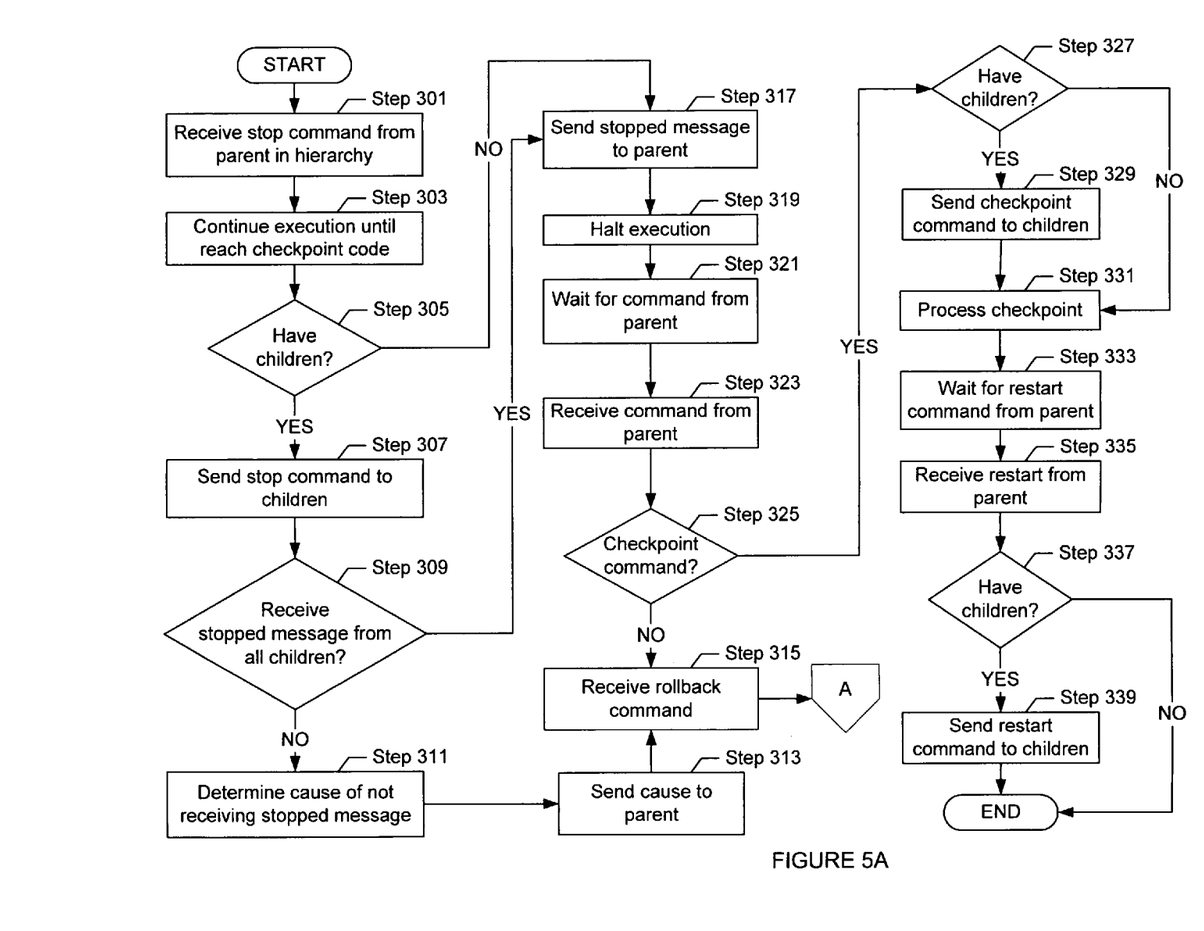
FIGS. 5A-5B shows a method for checkpointing and recovery in a distributed system by a subordinate in accordance with one embodiment of the invention.

FIG. 4 shows a method for checkpointing and recovery in a distributed system by a master in accordance with one embodiment of the invention. Initially, the master (e.g., 102 in FIG. 1) sends a stop command to subordinate nodes (e.g., 104, 106, 108, 110 in FIG. 1) (Step 215). The stop command may be propagated from the master to each subordinate node using the hierarchy (as described below in FIG. 5). If multiple masters exist, then the master nodes may synchronize sending the stop command.

Additionally, in one embodiment of the invention, the frequency of the stop command may be configurable. For example, as described above, certain uses of the distributed system require a checkpoint more often then other uses of the distributed system.

Continuing with FIG. 4, once the master has sent a stop command, then the master may wait until the master receives a response from the subordinate nodes (Step 217). In one embodiment of the invention, the master only receives a response from the direct subordinates of the master in the distributed system hierarchy when the children of the master receive a response from their subordinates.

Further, the master may wait until all subordinate nodes have responded with a checkpoint message or for a certain period of time. In one embodiment of the invention, the checkpoint message indicates that the subordinate nodes are executing the checkpoint code.

In one embodiment of the invention, when the time period has elapsed, the master may determine whether the master node has received a stopped message, directly or indirectly, from all the subordinate nodes (Step 219). In one embodiment of the invention, the stopped message from a subordinate indicates that the subordinate has continued execution to the checkpoint code and is currently waiting for instructions from the master before proceeding.

In one embodiment of the invention, if the master receives a stopped message from all of the subordinate nodes, then the master node may send a checkpoint command to the subordinate nodes (Step 221). The checkpoint command may propagate from the master to each subordinate node using the distributed system hierarchy (as described below in FIG. 5).

After sending the checkpoint command, in one embodiment of the invention, the master may wait until a checkpoint message is received from all subordinates (Step 223). In one embodiment of the invention, the checkpoint message may specify that the node sending the message has successfully stored a checkpoint (i.e., stored state information and a snapshot of memory). Those skilled in the art will appreciate that if a checkpoint message is not received, then in one embodiment of the invention, the master may begin recovery (as described below).

In one embodiment of the invention, if the master receives a checkpoint message from all of the subordinate nodes, then the master node may send a restart command to the subordinate nodes (Step 225). The restart command may propagate from the master to each subordinate node using the distributed system hierarchy (as described below in FIG. 5).

Alternatively, if the master has not received a stopped message from all of the subordinate nodes, then the master may begin the recovery. Specifically, the master may determine which subordinate node(s) did not stop (Step 227). Next, a determination may be made as to whether an application (or a subset of applications executing on the distributed system) fails to stop (Step 229). In one embodiment of the invention, if the cause of the failure is determined to be due to an application failing, then a rollback command may be sent to the application (Step 231). In one embodiment of the invention, the rollback command may specify the previous checkpoint of the application. Next, a determination is made as to whether the rollback was a success (Step 233). If the rollback was not a success, then the rollback command is sent to the application for the application to rollback to a prior checkpoint (Step 235). Alternatively, if the rollback was a success, then a restart command is sent to the subordinates (Step 235). The restart command may be propagated from the master to each subordinate using the distributed system hierarchy (as described below).

Alternatively, if cause of the failure is not because of a single application failing, then in one embodiment of the invention, the rollback command is sent to the distributed system (Step 237). When a rollback command is sent to the distributed system, then the entire distributed system may rollback execution to a previous checkpoint. In one embodiment of the invention, the rollback command may be propagated using the distributed system hierarchy shown in FIG. 5.

After sending the rollback command to the distributed system, a determination is made whether the rollback of the distributed system was a success (Step 239). If the rollback was not a success, then in one embodiment of the invention, another rollback command is sent to the distributed system to allow the distributed system to rollback to a different previous historical checkpoint (Step 237). Alternatively, if the rollback command was a success, then a restart command is sent to the subordinates (Step 235).

Those skilled in the art will appreciate that while FIG. 4 shows a rollback command to an application or to the distributed system, alternatively, the rollback command may specify one or more particular nodes. Additionally, in one embodiment of the invention, the determination to send the rollback command to an application or to the distributed system may be configurable. Specifically, if multiple related applications fail to respond, then the rollback command may be sent to the distributed system or to only the multiple related applications. Further, if the rollback of an application is not successful, then in one embodiment of the invention, the rollback command may be sent to the distributed system to rollback to a previous historical checkpoint.

Figure 5B:
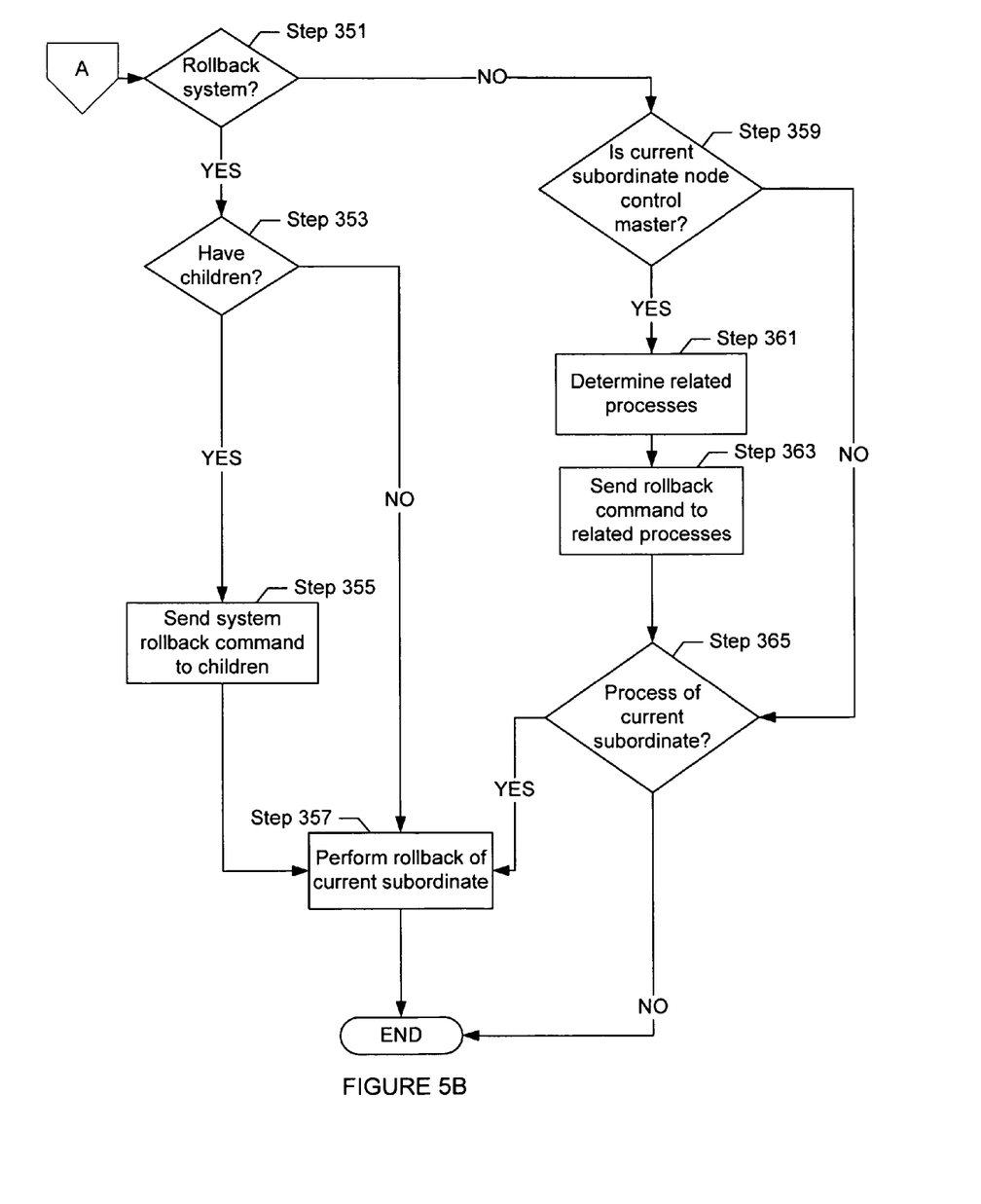

FIGS. 5A-5B show a method for checkpointing and recovery in a distributed system by a subordinate in accordance with one embodiment of the invention. Specifically, FIGS. 5A-5B shows steps performed by a subordinate node (hereinafter referred to as a "current subordinate") in the distributed system hierarchy in accordance with one embodiment of the invention. The current subordinate may be a node or a thread on a node in the hierarchy.

FIG. 5A shows a method for performing a checkpoint and initializing recovery in accordance with one embodiment of the invention. Initially, a stop command is received by the current subordinate from a parent in the hierarchy (Step 301). The current subordinate continues execution until the checkpoint code is reached (Step 303). Continuing execution maintains the cooperative process and assures that failure will not occur because of the diagnostics.

Once the checkpoint code is reached, a determination is made whether the current subordinate has any children (Step 305). If children of the current subordinate exist, then in one embodiment of the invention, a stop command is sent to the children of the current subordinate (Step 307).

Next, the current subordinate waits until the current subordinate receives a stopped message from the subordinates of the current subordinate (not shown). The current subordinate may wait until the stopped message propagates from subordinates of the current subordinate through children of the current subordinate. In one embodiment of the invention, the current subordinate may wait for a specific period of time. When the specific period of time has elapsed, then the current subordinate may determine whether all stopped messages have been received (Step 309). If all stopped messages have not been received or if an error message was received, then the current subordinate may determine the cause of not receiving the stopped message or only receiving an error message (Step 311). Next, in one embodiment of the invention, the cause is sent to the parent (313). Because subordinates of the current subordinate have a failure, the current subordinate typically receives a rollback message from the parent (Step 315). The rollback may be processed according to FIG. 5B.

Alternatively, in one embodiment of the invention, if the current subordinate does not have any children or if the current subordinate has received a stopped message from the children of the current subordinate, then the current subordinate sends a stopped message to the parent (Step 317).

In one embodiment of the invention, after sending the stopped message, execution of the current subordinate is halted at the checkpoint code (Step 319). The current subordinate may then wait for a command from the parent (Step 323). The restart command may be delayed until the master has received the checkpoint message, issued the restart command, and the restart command has propagated to the current subordinate (as described in FIG. 4). After receiving a command, a determination is made whether the command is a checkpoint command (Step 325). If the command is not a checkpoint command, then the current subordinate receives a rollback command (Step 315). The current subordinate may process the rollback command using the method described in FIG. 5B.

Alternatively, if the command is a checkpoint command, then a determination is made whether the current subordinate has children (Step 327). If the current subordinate has children, in one embodiment of the invention, the checkpoint command is sent to the children (Step 329).

Regardless of whether the current subordinate has children, in one embodiment of the invention, the checkpoint may be processed by the current subordinate (Step 331). Specifically, the current subordinate may store all state information associated with the current subordinate, and a snapshot of memory. Further, the current subordinate may store the process map (not shown). After processing the checkpoint, the current subordinate may receive a checkpoint message from any subordinates and send a checkpoint message to the parent (not shown). Next, the current subordinate may wait for a restart command from the parent (Step 333). Those skilled in the art will appreciate that if a checkpoint fails anywhere in the distributed computer system, then in one embodiment of the invention, rather than receiving a restart command, the current subordinate may receive a rollback command. In the scenario in which the current subordinates receives a rollback command, in one embodiment of the invention, the current subordinate may process the rollback command using the method described in FIG. 5B.

Continuing with FIG. 5A, once the current subordinate has received the restart command from the parent (Step 335), then the execution of the current subordinate may be restarted (not shown). After restarting execution of the current subordinate, a determination is made whether the current subordinate has children (Step 337). If the current subordinate has subordinates (i.e., children), then the restart command may be sent to the children (Step 339) and subsequently propagated to the subordinates of the current subordinate. Alternatively, if the distributed computer system fails to perform a checkpoint, then a recovery must be performed.

FIG. 5B shows a method for recovery by a subordinate in accordance with one embodiment of the invention. Specifically, FIG. 5B continues from Step 315 of FIG. 5A in which a rollback command is received by the current subordinate. Initially, a determination is made whether the rollback command is to rollback the distributed system (Step 351). If the rollback command is to rollback the distributed system, then a determination is made whether the current subordinate has children (Step 353). If the current subordinate has children, then the distributed system rollback command is sent to the children (Step 355). Next, regardless of whether the current subordinate has children, a rollback is performed on the current subordinate (Step 357). In one embodiment of the invention, the rollback may be performed by loading the snapshot of memory and the state information from a previous checkpoint. At this stage, the current subordinate may continue execution from the previous checkpoint.

Alternatively, if the rollback command is not a distributed system rollback command, then the rollback command is an application rollback command. An application rollback command specifies that only a particular application(s) need to perform the rollback. Accordingly, only the processes of the particular applications need to perform the rollback. Next, in one embodiment of the invention, a determination is made whether the current subordinate is a node control master (Step 359). If the current subordinate is a node control master, then the related processes are determined (Step 361). The related processes may be determined using the process map. Specifically, the node control master may access the listing of the related processes on the process map. After determining the related processes, the node control master may send the rollback command to the related processes (Step 363).

Regardless of whether the current subordinate is a node control master, next, in one embodiment of the invention, a determination is made whether a process in the related processes is the current subordinate (Step 365). If a process in the related processes is the current subordinate, then in one embodiment of the invention, a rollback is performed on the current subordinate (Step 357) by loading the snapshot of memory and state information from a previous checkpoint of the current subordinate. The rollback may be performed, for example, by the parent of the current subordinate. The current subordinate may then continue execution from the previous checkpoint.

Those skilled in the art will appreciate that while performing the rollback, the current subordinate may send success or failure messages to the parent in the hierarchy. Accordingly, if the current subordinate sends a failure message, then in one embodiment of the invention, the distributed system continues with the parent sending another rollback command to the current subordinate.

By using a distributed system hierarchy to propagate messages and commands, each thread and node in the distributed system hierarchy is required to be aware only of the thread's or node's parent and subordinates. Those skilled in the art will appreciate that the master node, or any other node, may optionally be aware of all threads and nodes in the distributed system and send the message directly to all threads and nodes.

Further, those skilled in the art will appreciate that the aforementioned commands and messages may be sent and received using virtually any technique known in the art, such as message passing, shared memory, signals, interrupts, etc.

Figure 6A:
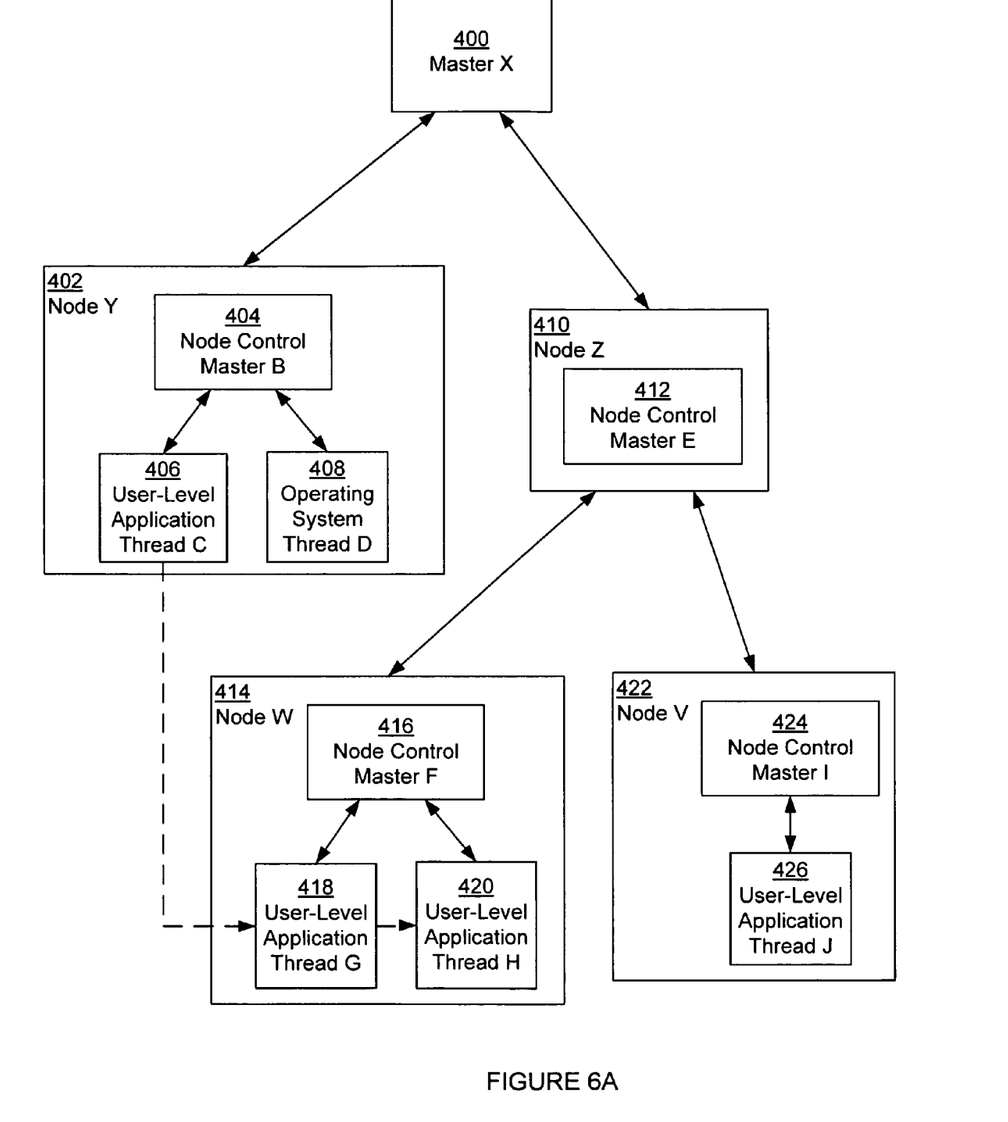
FIGS. 6A-6B shows an example of checkpointing and recovery of a distributed system in accordance with one embodiment of the invention.
Figure 6B:
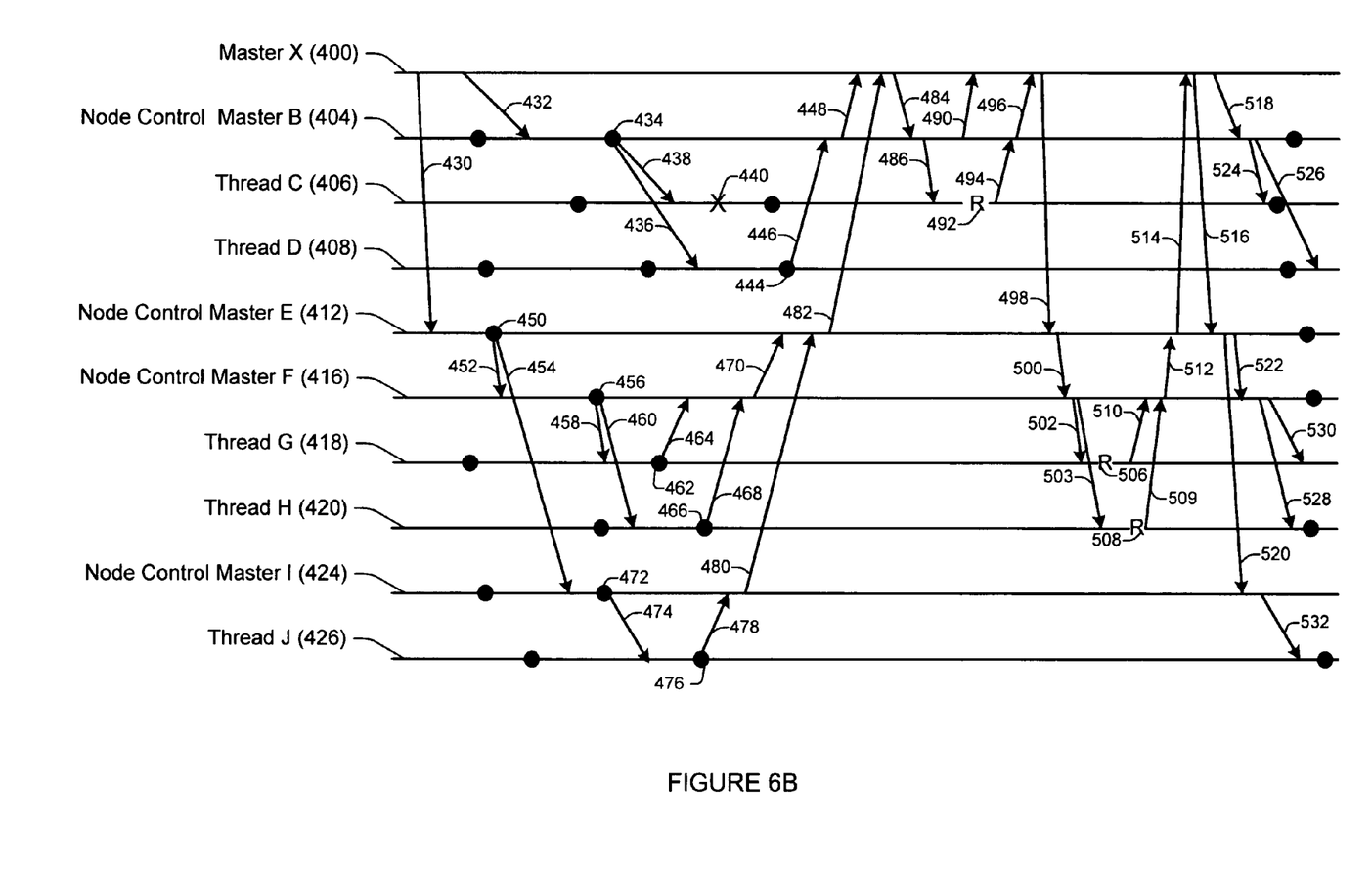

FIGS. 6A-6B shows an example of checkpointing a distributed computer system in accordance with one embodiment of the invention. Specifically, FIG. 6A shows an example of a hierarchical relationship in a distributed computer system. In the example, master X (400) has two children, node Y (402) and node Z (410), with which master X (400) may directly communicate. Executing on node Y (402) is a node control master B (404) which has child threads, user-level application thread C (406) and operating system thread D (408). Executing on node Z (410) is node control master E (412). Node Z (410) also has two children nodes, node W (414) and node V (422). Executing on node W (414) is a node control master F (416), which has child threads (i.e., user-level application thread G (418) and user-level application thread H (420)). Executing on node V (422) is node control master I (424), which has a child thread of user-level application thread J (426).

Further, as shown in FIG. 6A, user-level application thread C (406) is dependent on user-level application thread G (418). User-level application thread G (418) is dependent on user-level application thread H (420). The aforementioned dependency relationships may be caused by such operations as remote method invocations, method calls, system calls, etc.

FIG. 6B shows an example timing diagram for checkpointing in the distributed computer system of FIG. 6A in accordance with one embodiment of the invention. Initially, the master X (400) sends a stop command (430, 432) to node Y via node control master B (404) and to node Z via node control master E (412). In one embodiment of the invention, node control master B (404) determines whether a stop command has been issued when node control master B (404) executes the checkpoint code (434). Because such stop command has been issued, node control master B (404) sends a stop command (436, 438) to the children of node control master B (404), (i.e., thread C (406) and thread D (408)) and waits for a response. Thread C (406) continues execution and then crashes (440) before executing a checkpoint code.

In contrast, thread D (408) continues execution until thread D (408) executes the checkpoint code (444). Upon execution of the checkpoint code (444), thread D (408) sends a stopped message (446) to node control master B (404) and halts. When node control master B (404) receives the stopped message (442, 446) from thread D (408) and fails to receive a stopped message from thread C (406), node control master B (404) sends an error message (448) to master X (400) and halts.

Continuing with example in FIG. 6B, in a manner similar to node control master B (404), when node control master E (412) executes the checkpoint code (450), node control master E (412) determines whether a stop command has been received. Because such stop command (430) has been received, node control master E (412) sends a stop command (452, 454) to the subordinates of node control master E (412) through child node W (414) via node control master F (416) and through child node V (422) via node control master I (424).

Upon receiving the stop command (452), node control master F (416) continues executing until node control master F (416) executes the checkpoint code (456). Because node control master F (416) has children, node control master F (416) sends a stop command (458, 460) to thread G (418) and thread H (420). Thread G (418) sends a stopped message (464) to node control master F (416) when thread G (418) executes the checkpoint code (462). Next, thread G (418) halts. Similarly, thread H (420) sends a stopped message (468) to node control master F (416) when thread H (420) executes the checkpoint code (466). Next, thread H (420) halts. Once node control master F (416) has received a response from both thread G (418) and thread H (420), node control master F (416) sends a stopped message (470) to node control master E (412) and halts.

Likewise, when node control master I (424) receives the stop command from node control master E (412), node control master I (424) continues execution until the checkpoint code (472). While executing the checkpoint code (472), node control master I (412) determines that a stop command (454) has been received. Accordingly, node control master I (412) sends the stop command (474) to thread J (426). When thread J (426) executes the checkpoint code (476), thread J (426) sends a stopped message (478) to node control master I (424) and halts. Because thread J (426) is the only subordinate of node control master I (424), node control master I (424) sends a stopped message (480) to node control master E (412) and node control master I (424) halts.

Continuing with the example of FIG. 6B, at this stage, node control master E (412) has received a stopped message (470, 480) from both node control master F (416) and node control master I (424). Thus, node control master E (412) is aware that all of the subordinates of node control master E (412) have reached a checkpoint (e.g., 456, 462, 466, 472, 476). Accordingly, node control master E (412) sends a stopped message (482) to master X (400) and halts.

Because master X (400) has received an error message (448) from node control master B (404), master X (400) sends an application rollback command (484) to node control master B (404). Upon receiving the application rollback command (484), in one embodiment of the invention, node control master B (404) determines that thread C (406) and a process on another node (i.e., 414 from FIG. 6A) are a related processes. Accordingly, sends the rollback command (486, 490) to thread C (406) and to master X (400). Accordingly, a rollback may be performed on thread C (494). Once the rollback is performed, in one embodiment of the invention, thread C (406) sends a success message (494) to node control master B (404), which forwards the success message (496) to master X (400).

Those skilled in the art will appreciate that because thread C (486) crashed, if thread C (486) cannot process the rollback command, then in one embodiment the invention, the parent of thread C (486) (i.e., node control master B (404)) may process the rollback command for thread C (486).

Continuing with FIG. 6B, when master X (400) receives a related process rollback command, master X (400) may forward the related process rollback command (498) to node control master E (412), which also forwards the related process rollback command (500) to node control master F (416). Next, node control master F (416) may access the process map and determine that thread G (418) is related to rollback command and thread H (420) is related to G (418). Accordingly, node control master F (416) sends to thread G (418) and thread H (420) a rollback command (502, 503). Next, thread G (418) and thread H (420) process the rollback (506, 508). Once thread G (418) and thread H (420) have processed the rollback (506, 508), thread G (418) and thread H (420) may each send a success message (509, 510) to node control master F (416). Node control master F (416) may then forward the success message (512) to node control master E (412), which forwards the success message (514) to master X (400).

Because master X (400) has received a success message from both node control master B (404) and node control master E (412), master X (400) may propagate a restart command to the distributed system. Specifically, master X (400) sends a restart command (516, 518) to node control master B (404) and node control master E (412). Node control master B (404) sends the restart command (524, 526) to thread C (406) and thread D (408). Similarly, node control master E (412) sends the restart command (520, 522) to node control master F (416) and node control master I (424). Node control master F sends the restart command (528, 530) to thread G (418) and thread H (420). Node control master I sends the restart command to thread J (532). In one embodiment of the invention, upon receiving the restart command, each thread continues execution as normal.

Figure 7:
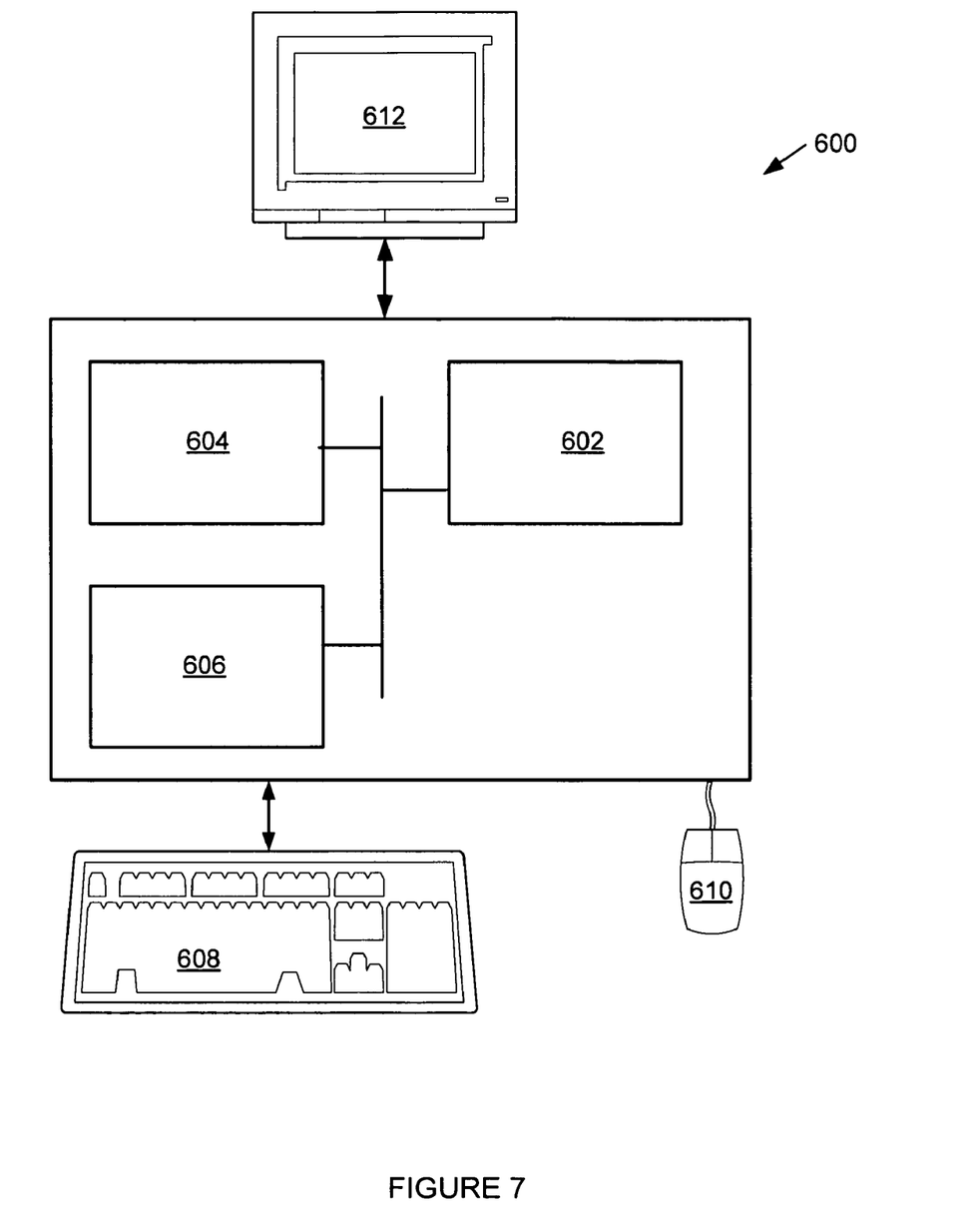
FIG. 7 shows a computer system in accordance with one embodiment of the invention.

The invention may be implemented on virtually any type of computer regardless of the platform being used. For example, as shown in FIG. 7, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., a master node, a subordinate node, etc.) may be located on a different node within the distributed system. In one embodiment of the invention, the node corresponds to a computer system. Alternatively, the node may correspond to a processor with associated physical memory. Further, the distributed system may correspond to multiple processors located on a single motherboard. Software instructions to perform embodiments of the invention may be stored on a computer readable medium such as a compact disc (CD), a diskette, a tape, a file, or any other computer readable storage device.

The present invention may include one or more of the following advantages. One or more embodiments of the invention are able to automatically perform a checkpoint and recovery. Specifically, in one embodiment of the invention, by including checkpoint code on all user-level application and operating system threads, the master is able to determine a failure of any of the threads and recover only the failed portions of the distributed system. More specifically, by using a process map, all related processes may be determined. Accordingly, time is saved because only the affected portions are recovered rather than the entire distributed system.

Additionally, by allowing the threads to continue execution and operating in a cooperative manner, embodiments of the invention provide a mechanism for detecting whether the threads are still executing and in a manner which does not crash the system. Specifically, by not forcing a thread to stop immediately, the thread must execute instructions in order to execute the checkpoint code that is a part of the instruction set of the thread. Accordingly, in one embodiment of the invention, when the thread executes the checkpoint code, the master node is assured that the thread is still operating. Alternatively, in one embodiment of the invention, if a thread stops executing, or executes an infinite loop, then the thread never reaches the checkpoint code. Therefore, the master may detect an error on the thread.

Further, by inserting the checkpoint code directly into the instructions, the thread executes in a manner to avoid the critical sections allowing for the master node to send a stop command and not crash the thread or node by the command. Specifically, in one embodiment of the invention, the thread and node do not halt unless the thread or node is in a safe portion of the executing instructions to halt.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for checkpointing a system comprising:
    inserting a checkpoint comprising checkpoint code into source code of an operating system using dynamic code generation;
    receiving a stop command by an executing thread from a master, wherein the executing thread executes the operating system;
    continuing execution of the executing thread until the checkpoint is reached after receiving the stop command;
    halting execution of the executing thread at the checkpoint; and
    checkpointing the system by storing a state and a snapshot of memory.

2. The method of claim 1, further comprising:
    determining whether a failure exists in the system; and
    if failure exists, performing a rollback placing the system in the state prior to failure.

3. The method of claim 2, further comprising receiving a restart command from the master by the executing thread.

4. The method of claim 2, wherein performing a rollback comprises reloading the state and the snapshot of memory from a previous checkpoint of the system.

5. The method of claim 2, wherein performing a rollback comprises reloading the state and the snapshot of memory from a previous checkpoint of an application.

6. The method of claim 5, wherein performing a rollback comprises accessing a process map to determine whether a process is related to the application.

7. The method of claim 1, further comprising:
    forwarding the stop command from a node control master to a subordinate after reaching the checkpoint; and
    forwarding a checkpoint command to the subordinate by the node control master.

8. The method of claim 7, further comprising forwarding a rollback command to the subordinate by the node control master.

9. The method of claim 1, wherein the frequency of the stop command is configurable.

10. A system for checkpointing comprising:
    a plurality of subordinates configured to:
        receive a stop command;
        continue execution until reaching a checkpoint after receiving the stop command;
        halt execution at the checkpoint;
        forward a response if the stop command is processed;
        receive a checkpoint command; and
        checkpoint the system by storing a state and a snapshot of memory at the checkpoint; and
    a master configured to:
        send the stop command to a subordinate in the plurality of subordinates, wherein the subordinate is an operating system thread; and
        send a checkpoint command to the subordinate,
    wherein the checkpoint comprises checkpoint code inserted into source code executing on the system, and
    wherein the checkpoint code is inserted into the source code using dynamic code generation.

11. The system of claim 10, wherein the system is further configured to:
    determine whether a failure exists in the system; and
    perform a rollback if failure exists to place the system in the state prior to failure.

12. The system of claim 11, wherein the subordinates are further configured to:
    receive a restart command from the master.

13. The system of claim 11, wherein performing a rollback comprises reloading the state and the snapshot from a previous checkpoint of the system.

14. The system of claim 11, wherein performing a rollback comprises reloading the state and the snapshot of memory from a previous checkpoint of an application.

15. The system of claim 14, wherein performing a rollback comprises accessing a process map to determine whether a process is related to the application.

16. The system of claim 10, further comprising:
    a node control master configured to:
        receive a stop command from a master;
        forward the stop command to each subordinate in the plurality of subordinates after reaching the checkpoint;
        receive a checkpoint command from a master; and
        forward the checkpoint command to each subordinate in the plurality of subordinates after reaching the checkpoint.

17. The system of claim 16, wherein the node control master is further configured to:
    forward a rollback command to each subordinate in the plurality of subordinates.

18. The system of claim 10, wherein the master comprises a plurality of master nodes.

19. The system of claim 18, wherein the plurality of master nodes synchronize sending the stop command.

20. The system of claim 10, wherein the frequency of the stop command is configurable.

21. A distributed system having a plurality of nodes comprising:
    a plurality of subordinates executing on the plurality of nodes configured to:
        receive a stop command;
        continue execution until reaching a checkpoint after receiving the stop command;
        halt execution at the checkpoint;
        forward a response if the stop command is processed;
        receive a checkpoint command; and checkpoint the system by storing a state and a snapshot of memory at the checkpoint; and a master comprising at least one node configured to:
  send the stop command to a subordinate in the plurality of subordinates, wherein the subordinate is an operating system thread; and
  send a checkpoint command to the subordinate, wherein the checkpoint comprises checkpoint code inserted into source code executing on the distributed system, and wherein the checkpoint code is inserted into the source code using dynamic code generation.

* * * * *